May 31, 1949.   P. A. SMITH   2,471,906
PULLEY
Filed July 27, 1946

INVENTOR
PAUL A. SMITH
BY Archworth Martin
ATTORNEY

Patented May 31, 1949

2,471,906

UNITED STATES PATENT OFFICE 2,471,906

PULLEY

Paul A. Smith, Mars, Pa.

Application July 27, 1946, Serial No. 686,699

3 Claims. (Cl. 74—230.3)

My invention relates to pulleys or sheaves and more particularly to those of the grooved type for use with V-belts, rope drives and the like, similar to that shown in my co-pending application Serial No. 629,428, filed November 19, 1945, the present case embodying an improvement not disclosed in said application.

My invention has for its object the provision of pulley units that can readily be mounted singly or in multiple, in a simplified and improved manner, and with a fewer number of connecting parts than have heretofore been required in pulleys of this general type.

Figure 1:
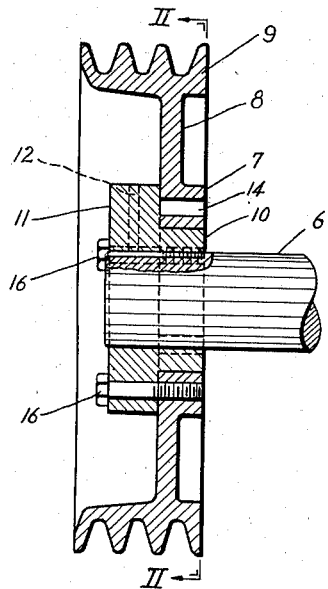
Figure 5:
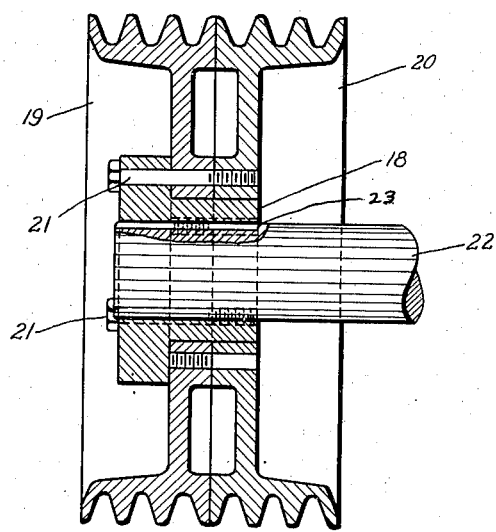
Figure 2:
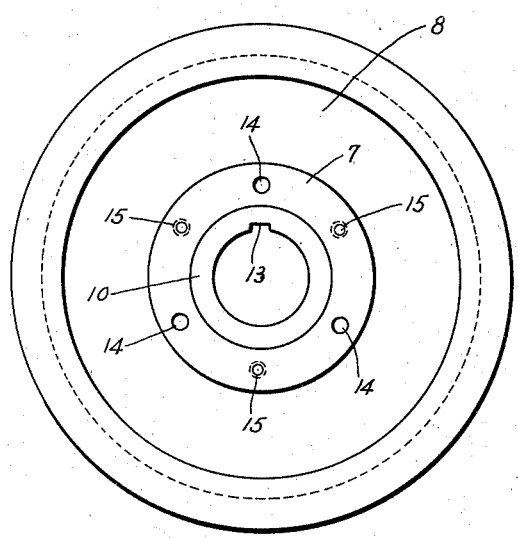
Figure 3:
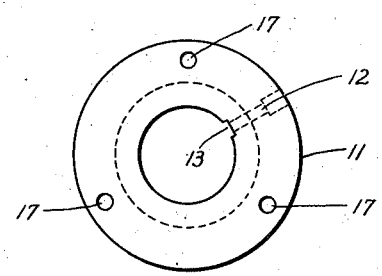
Figure 4:
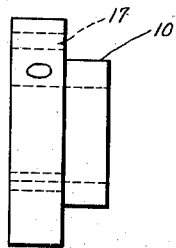

In the accompanying drawing, Figure 1 is a sectional view through a single sheave and showing the manner in which it is attached to a shaft; Fig. 2 is a view taken on the line II—II of Fig. 1, but with the shaft omitted; Fig. 3 is an end view of the hub of Fig. 1; Fig. 4 is a side view thereof, and Fig. 5 shows the manner in which two pulleys of the form shown in Fig. 1, can be mounted as a unit.

The sheave of Fig. 1 is shown as mounted on a shaft 6. The sheave comprises an annular rib or boss 7, a web portion 8 and a grooved-rim portion 9. A hub 10 fits within the annular boss 7 and closely embraces the shaft 6. The hub has a circular flange or boss 11 which has a tapped opening 12 for the reception of a set screw which will extend to a key-way 13 formed in the hub so as to retain a key in place between the hub and the shaft 6.

Three smooth-walled holes 14 and three threaded holes 15 extend through the boss 7. When only the single sheave of Fig. 1 is to be mounted on the shaft, the parts will be assembled thereon as shown in Fig. 1, with screws 16 extending through the three holes 17 of the hub 10 and having threaded engagement with the threads of the holes 15 in the hub 7.

When it is desired to mount two sheaves similar to that of Fig. 1, on a shaft, a hub 18 which is of somewhat greater length than the hub 10 will be inserted into the annular bosses of the sheaves 19 and 20. In this instance, three screws 21 will be inserted through the flange of the hub 18 and through the smooth-walled holes 14 of the sheave 19, the sheave 20 being turned so that its three threaded holes will be engaged by the threads of the screws 21.

The sheaves 19—20 are keyed at 23 to the shaft 22 in the same manner as the sheave of Fig. 1 and the screws 21 will hold the two sheaves in firm engagement with one another. The sheaves 19—20 may be of identical form and size or of different widths and diameters. In any case, either one may be used singly on a shaft. For example, if the sheave 19 is to be used alone, it will be mounted as in Fig. 1. If the sheave 20 is to be mounted alone it can be turned so that its boss projects inwardly as in Fig. 1, instead of outwardly as in Fig. 5, and its threaded holes brought into axial alinement with the holes 17 of the hub, to receive the screws 16.

I claim as my invention:

1. A power-transmitting unit comprising a pulley having a central opening surrounded by a rib that is provided with holes that extend axially therethrough, a hub fitting within the opening and adapted for connecting to a shaft, a flange on the hub engaging an end face of the rib, screws extending through the flange and through the holes in the rib, and means for rigidly connecting the screws to the rib, the said means comprising a second pulley on the inner portion of the hub and having an annular rib with tapped holes, for engagement by the screw threads.

2. A power-transmitting unit comprising a pulley having a central opening surrounded by a rib that is provided with holes that extend axially therethrough, a hub fitting within the opening and adapted for connection to a shaft, a flange on the hub engaging an end face of the rib, screws extending through the flange and through the holes in the rib, and means for rigidly connecting the screws to the rib, the said means comprising a second pulley of similar form on the inner portion of the hub and having tapped holes therein, for engagement by the screw threads, each pulley rib having a plurality of tapped holes and a plurality of smooth-bore holes, spaced equidistant from the axis of the hub, whereby they may be connected to the hub either singly or together.

3. A power-transmitting unit comprising a pulley having a central opening surrounded by a rib that is provided with holes that extend axially therethrough, a hub fitting within the opening and adapted for connection to a shaft, a flange on the hub engaging an end face of the rib, screws extending through the flange and through the holes in the rib, and means for rigidly connecting the screws to the rib, the said means comprising a second pulley on the inner portion of the hub and having detachable connection with the said screws.

PAUL A. SMITH.

REFERENCES CITED

The following references are of record in the file of this patent:

UNITED STATES PATENTS

| Number | Name | Date |
|---|---|---|
| 464,795 | Dodge | Dec. 8, 1891 |
| 835,546 | Moore | Nov. 13, 1906 |
| 1,740,087 | Hall | Dec. 17, 1929 |
| 2,269,821 | Kemphert et al. | Jan. 13, 1942 |